UNITED STATES PATENT OFFICE 1,927,355

FLUX FOR USE IN SOLDERING METALS

Charles Harold Aston, Christchurch, New Zealand

No Drawing. Application May 12, 1931, Serial No. 536,941, and in New Zealand January 21, 1931

2 Claims. (Cl. 148—25)

This invention relates to fluxes for use in soldering metals, and has for its object the provision of an improved form of flux, particularly adapted for use with the solder described and claimed in my co-pending application for Letters Patent of the United States of America, Serial No. 536,943 filed May 12, 1931, for soldering aluminium and duralumin, but which flux can also be successfully used with known solders in soldering tin, lead, brass, copper, bronze, gunmetal, muntz metal, zinc, and tinned steel.

The improved flux consists of Venice turpentine, balsam copaiba, resin, and oil of paraffin.

The above mentioned ingredients are combined in the proportions of one part (by measure) of Venice turpentine; three parts (by measure) of balsam copaiba; one part (by measure) of liquefied resin; and one part (by measure) of oil of paraffin. "Balsam copaiba" is a gum obtained from trees in North America, the name of which is "Copaifera landorfie".

The procedure observed in combining the ingredients, is to mix the Venice turpentine and balsam copaiba together in an aluminium pan and heat same over flame to boiling point, following which the resin which has already been brought to melting point, is mixed into the other combined ingredients, the resultant being allowed to cool off.

This flux has been specially produced to enable aluminium and duralumin to be soldered with the solder forming the subject of United States Serial No. 536,943 before referred to, but said flux can also be successfully used with known solders on the other metals enumerated herein.

What I do claim and desire to secure by Letters Patent of the United States of America is:—

1. A flux for use in soldering metals consisting of Venice turpentine; balsam copaiba; resin; and oil of paraffin, used in the proportions of one part of Venice turpentine; three parts of balsam copaiba; one part of liquefied resin; and one part of oil of paraffin all by measure.

2. A flux for use in soldering metals consisting of Venice turpentine; balsam copaiba; resin; and oil of paraffin, used in the proportions of one part of Venice turpentine; three parts of balsam copaiba; one part of liquefied resin; and one part of oil of paraffin all by measure, and produced by mixing the Venice turpentine and the balsam copaiba in an aluminium pan and heating same over a flame to the boiling point, and then mixing in resin previously brought to the melting point.

CHARLES HAROLD ASTON.